(12) United States Patent
Onodera et al.

(10) Patent No.: US 9,494,254 B2
(45) Date of Patent: Nov. 15, 2016

(54) ELECTRO-MAGNETIC VALVE

(71) Applicant: DENSO CORPORATION, Kariya, Aichi-pref. (JP)

(72) Inventors: Hirofumi Onodera, Kariya (JP); Yuichiro Miura, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/619,333

(22) Filed: Feb. 11, 2015

(65) Prior Publication Data
US 2015/0226348 A1  Aug. 13, 2015

(30) Foreign Application Priority Data
Feb. 13, 2014  (JP) .................. 2014-025519

(51) Int. Cl.
F16K 31/12  (2006.01)
F16K 39/02  (2006.01)
F16K 31/06  (2006.01)
F02M 25/08  (2006.01)

(52) U.S. Cl.
CPC ........ F16K 39/024 (2013.01); F02M 25/0836 (2013.01); F16K 31/0655 (2013.01); F02M 2025/0845 (2013.01)

(58) Field of Classification Search
CPC ............ F16K 39/024; F16K 31/0655; F02M 25/0836; F02M 2025/0845
USPC ................... 251/30.01–30.04, 282; 137/630
See application file for complete search history.

(56) References Cited

U.S. PATENT DOCUMENTS

| | | | | |
|---|---|---|---|---|
| 2,502,256 A | * | 3/1950 | Harding, Jr. | .......... F16K 31/406 |
| | | | | 137/630 |
| 7,401,762 B2 | * | 7/2008 | Ohmori | ..................... F16K 1/36 |
| | | | | 137/340 |
| 7,770,598 B2 | * | 8/2010 | Bittner | ................ F16K 31/0655 |
| | | | | 137/630.15 |
| 2005/0217734 A1 | | 10/2005 | Takakura | |
| 2013/0134339 A1 | | 5/2013 | Miura et al. | |

* cited by examiner

*Primary Examiner* — Marina Tietjen
*Assistant Examiner* — Umashankar Venkatesan
(74) *Attorney, Agent, or Firm* — Nixon & Vanderhye P.C.

(57) ABSTRACT

A two-stage electro-magnetic valve maintains a pressing force applied onto a switch valve body from a press member after a lifting of an open-close valve body from a valve seat by an introduction of a pressure of a valve chamber. In such manner, the switch valve body need not be put in a pressure receiving state when the switch valve body is completely closed. In other words, it is not necessary for a pressure receiving diameter of the switch valve body to be smaller than a pressure receiving diameter of the open-close valve body. Such configuration increases design freedom of the pressure receiving diameter for the open-close valve body because it separates the diameter of the valve body from a diameter restriction of the switching valve body, which allows both valve bodies to have the same diameter, which maximizes the effect of a pressure cancel mechanism.

6 Claims, 12 Drawing Sheets

BACKWARD ←→ FORWARD
AXIAL DIRECTION

BACKWARD ←——→ FORWARD
AXIAL DIRECTION

BACKWARD ⟵⟶ FORWARD
AXIAL DIRECTION

BACKWARD ←——→ FORWARD
AXIAL DIRECTION

BACKWARD ←——→ FORWARD
AXIAL DIRECTION

BACKWARD ←→ FORWARD
AXIAL DIRECTION

--PRIOR ART--

--PRIOR ART--

ELECTRO-MAGNETIC VALVE

CROSS REFERENCE TO RELATED APPLICATION

The present application is based on and claims the benefit of priority of Japanese Patent Application No. 2014-25519, filed on Feb. 13, 2014, the disclosure of which is incorporated herein by reference.

TECHNICAL FIELD

The present disclosure generally relates to an electro-magnetic valve.

BACKGROUND INFORMATION

An electro-magnetic valve may be used as a tank sealing valve in an evaporated fuel processing apparatus. As shown in FIG. 12 of a patent document 1 (i.e., Japanese Patent Laid-Open No. 2013-113401), such an electro-magnetic valve 100A includes a valve chamber 103 to which a first passage 101 that is connected to a canister and a second passage 102 that is connected to a fuel tank are respectively connected. The electro-magnetic valve 100A also includes a valve body 104 housed in the valve chamber 103 which opens and closes the first passage 101, and an electro-magnetic actuator 105 which drives the valve body 104 toward a valve opening direction.

The valve body 104 lifts from and seats on an annular valve seat 106 formed on an edge of an opening of the first passage 101, for communication and dis-communication between the first passage 101 and the second passage 102 via the valve chamber 103, that is, for opening and closing communications therebetween.

The electro-magnetic valve 100A of the patent document 1 has a pressure cancel mechanism. When a high pressure is applied on an opposite side, that is, an away-from-seat side, of the valve body 104 relative to the valve seat during a valve close time, a drive power for driving the valve body 104 must also be driven at a high power, which may deteriorate responsiveness of the driving operation of the valve body 104.

Thus, a pressure cancel mechanism for canceling differential pressure before and behind the valve body 104, that is, a pressure difference between a valve seat side and an away-from-seat side, at the valve close time is provided as a pressure cancel chamber 108 that is formed behind (i.e., on the away-from-seat side of) the valve body 104 into which a pressure of the first passage 101 is introduced.

For example, in the patent document 1, the pressure cancel chamber 108 is air-tightly defined against the valve chamber 103 by a pressure chamber defining member 109 (e.g., a diaphragm in this example) that is connected to a behind side of the valve body 104. In such a structure, the valve body 104 receives a pressure receiving load Fb of the pressure cancel chamber 108, i.e., on the away-from-seat side via the pressure chamber defining member 109, and the valve body 104 also receives a pressure receiving load F1 from the first passage 101 on the valve seat side.

To make the most of the effect of this pressure cancel mechanism, it is desirable to equalize those two pressures, i.e., the pressure receiving load Fb and the pressure receiving load F1. That is, it is desirable that a pressure receiving diameter Dv of the valve body 104 is configured to be equal to an effective pressure receiving diameter Dc of the pressure chamber defining member 109. In such case, the pressure receiving diameter Dv of the valve body 104 is a diameter of a surface that receives pressure from the first passage 101 at the valve close time of the valve body 104. Further, the effective pressure receiving diameter Dc of the pressure chamber defining member 109 is a diameter computed from an area size (i.e., an effective pressure receiving area size) determined based on "a load (i.e., pressure) put on the pressure chamber defining member 109."

Further referring to the other document, a patent document 2 (i.e., Japanese Patent Laid-Open No. 2005-291241) discloses an electro-magnetic valve 100B which prevents a steep increase of an opening area size at the time of valve opening as shown in FIG. 13 (in FIG. 13, the same numerals are assigned to the same configuration as the electro-magnetic valve 100A of FIG. 12).

In the electro-magnetic valve 100B, the first valve body 104A, which lifts from and seats on a first valve seat 106a formed on an edge of an opening of the first passage 101, has a communication hole 111 bored therein for communication between the first passage 101 and the valve chamber 103, and the second the valve body 104B provided as another valve body is used to opens and closes the communication hole 111. The first valve body 104A is designated as the switch valve body 104A, because it switches an amount of the flow between the first passage 101 and valve chambers 103. The second valve body 104B is designated as the open-close valve body 104B, because it opens and closes the first passage 101.

The open-close valve body 104B is driven by the electro-magnetic actuator 105, and the switch valve body 104A is biased by a spring 112 in a valve lift direction, and is driven by a pressure difference before and behind the switch valve body 104A.

That is, when the open-close valve body 104B lifts from the seat, the first passage 101 and the valve chamber 103 communicate with each other via communication hole 111 of the switch valve body 104A. In other words, a fluid flows to the first passage 101 from the second passage 102. The switch valve body 104A is in a seated state under the pressure of the valve chamber 103 immediately after the lifting of the open-close valve body 104B. Then, in a short time, as the pressure of the valve chamber 103 (i.e., the pressure of the second passage 102) falls, the switch valve body 104 lifts from the seat according to the biasing force of the spring 112.

Then, the pressure cancel mechanism is also provided in the electro-magnetic valve 100B. In this electro-magnetic valve 100B, a bellows is used instead of the diaphragm as the pressure chamber defining member 109. In this case, too, to make the most of the effect of the pressure cancel mechanism, it is desirable that the pressure receiving diameter Dv2 of the open-close valve body 104B is equated to the effective pressure receiving diameter Dc of the pressure chamber defining member 109, just like the above-mentioned example.

In such case, for the two-stage type electro-magnetic valve 100B having the two valve bodies, a mechanism for keeping a valve seated state is required with which the switch valve body 104A is kept seated immediately after the lifting of the open-close valve body 104B.

Such a mechanism of the electro-magnetic valve 100B is provided as a structure in which (i) the pressure receiving diameter Dv1 of the switch valve body 104A is longer than the pressure receiving diameter Dv2 of the open-close valve body 104B, and (ii) the pressure receiving load by the differential pressure between the valve chamber 103 and the first passage 101 starts to act on the switch valve body 104A while the open-close valve body 104B is still in the seated state. According to such mechanism, the switch valve body 104A is kept in the seated state according to the pressure receiving load.

In other words, the electro-magnetic valve 100B has a restriction that the pressure receiving diameter Dv2 of the open-close valve body 104B must be smaller than the pressure receiving diameter Dv1 of the switch valve body 104A.

When, on the other hand, the pressure receiving diameter of Dv1 of the switch valve body 104A is increased too much, a negative pressure in a fuel tank inducing a negative pressure in an inside of the valve chamber 103 causes the lifting of the switch valve body 104A from the seat even when the open-close valve body 104B is not in a driven state, which is a deficiency of the electro-magnetic valve to be serving as a tank sealing valve. That means, there is another restriction that the pressure receiving diameter Dv1 cannot be increased too much.

Therefore, in the conventional electro-magnetic valve 100B, there are a couple of restrictions in terms of the diameter Dv1 and the diameter Dv2, since the pressure receiving diameter of Dv2 of the open-close valve body 104B is determined, not freely, but by the relationship with the pressure receiving diameter of Dv1 of the switch valve body 104A. In other words, the effective pressure receiving diameter Dc has to be set in the middle of the pressure receiving diameter Dv2 and the pressure receiving diameter of Dv1.

In other words, in the conventional electro-magnetic valve 100B, the pressure receiving diameter of Dv2 of the open-close valve body 104B cannot be equated to the effective pressure receiving diameter Dc of the pressure chamber defining member 109, thereby making it impossible to maximize the effect of the pressure cancel mechanism.

SUMMARY

It is an object of the present disclosure to maximize an effect of a pressure cancel mechanism of a two-stage electro-magnetic valve.

The electro-magnetic valve of the present disclosure is provided with a valve chamber, a first valve seat, a switch valve body, a first spring, a second valve seat, an open-close valve body, a return spring, an electro-magnetic actuator, and a pressure chamber defining member. The valve chamber is a space that has a first passage opening open to a first passage and a second passage opening open to a second passage. The first valve seat is annularly formed on an outside of the first passage opening in the valve chamber. The switch valve body is housed in the valve chamber, and has a communication hole that has a smaller diameter than the first passage opening, and switches a flow amount of a flow between the first passage and the valve chamber by lifting from and seating on the first valve seat. The first spring biases the switch valve body to lift away from the first valve seat. The second valve seat is annularly formed on an outside of an opening of the communication hole.

The open-close valve body is another valve body that is positioned on an lift-off side (i.e., an away-from-seat side) of the switch valve body relative to the first valve seat, and open and closes the first passage to and from the valve chamber for communication and dis-communication between the first passage and the second passage by lifting from and seating on the second valve seat while the switch valve body is seating on the first valve seat.

The return spring biases the open-close valve body toward the second valve seat. The electro-magnetic actuator, which is positioned on an lift-off side of the open-close valve body relative to the second valve seat, lifts the open-close valve body from the second valve seat against a biasing force of the return spring.

The pressure chamber defining member defines a pressure cancel chamber that reduces a pressure difference between both sides, i.e., an upstream and a downstream, of the open-close valve body by applying the same pressure as a pressure in the first passage on the lift-off side of the open-close valve body, the lift-off side away from the second valve seat.

The present the electro-magnetic valve is a so-designated the electro-magnetic valve of two-stage type, and, when the open-close valve body and the switch valve body operate one by one, an all-close state, an open-in-part state, and an all open state are realized.

When the switch valve body is seated on the first valve seat and the open-close valve body is seated on the second valve seat, communication between the first passage and the second passage is closed/intercepted, which is an all-close state.

When the open-close valve body is lifted from the second valve seat by the drive of the electro-magnetic actuator and the switch valve body is seated on the first valve seat by receiving a pressure of the valve chamber, communication between the first passage and the second passage via the communication hole and the valve chamber is partially opened, which is an open-in-part state.

And, when, due to a pressure reduction of the valve chamber after the lifting of the open-close valve body, the switch valve body lifts from the first valve seat, communication between the first passage and the second passage is opened via the opening and the valve chamber, which is an all-open state.

Further, the electro-magnetic valve of the present disclosure has, at a position in an inside of an abutting part that has an annular shape for seating on the second valve seat, a press member that presses the switch valve body toward the first valve seat with a biasing force greater than a force from the first spring during a period (a) between the all-close state and (b) a timing immediately after the lifting of the open-close valve body from the second valve seat.

In other words, in the present disclosure, the press member is a structure that keeps the switch valve body in a seated state up until an immediately-after timing of the lifting of the open-close valve body, which forcefully presses the switch valve body against the valve seat up to such timing. In such case, since the pressure of the valve chamber is immediately applied to the switch valve body when the open-close valve body is lifted, the switch valve body is keep in a seated state by receiving such pressure applied thereon.

Therefore, according to the present disclosure, unlike the conventional technique, the switch valve body needs not to receive the pressure while the open-close valve body is seated, which makes it unnecessary to shrink a pressure receiving diameter of the open-close valve body to be smaller than a pressure receiving diameter of the switch valve body. In other words, the pressure receiving diameter of the open-close valve body is freely designed from a restriction of the pressure receiving diameter of the switch valve body, which increases its design flexibility. Therefore, for making the most of an effect of a pressure cancel mechanism, it becomes possible to have the diameter of the open-close valve body configured to be equal to the effective pressure receiving diameter of the pressure chamber defining member. In other words, the pressure cancel mechanism is utilized to the full in a maximized manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
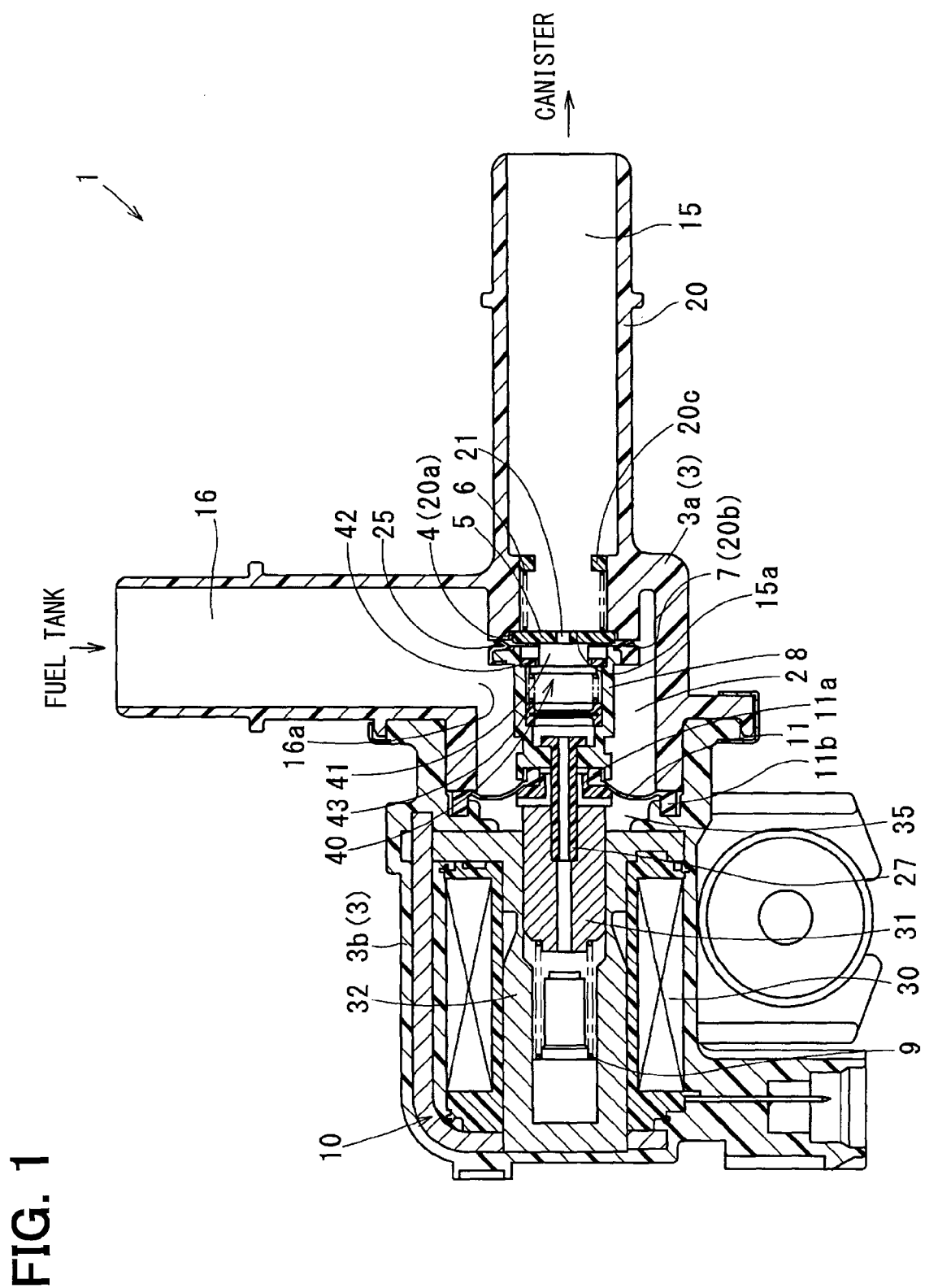
FIG. 1 is a sectional view of an electro-magnetic valve in a first embodiment of the present disclosure.

The following embodiments describe details about the embodiments of the present disclosure.

First Embodiment

The first embodiment is described with reference to FIGS. 1-9.

The electro-magnetic valve of this example is a tank sealing valve 1 of an evaporated fuel transpiration prevention apparatus, for example.

The evaporated fuel transpiration prevention apparatus prevents a transpiration of the evaporated fuel to the atmosphere by re-directing a fluid, i.e., the evaporated fuel in the fuel tank, to an intake pipe of an internal-combustion engine via a canister.

The tank sealing valve 1, which is connected in the middle of piping between a fuel tank and a canister, opens and closes the communication between the fuel tank and the canister.

The tank sealing valve 1 is a normally-closed type, and opens a passage between the fuel tank and the canister according to a valve open command from an ECU. For example, at a fuel refill time, according to the valve open command from the ECU or the like, the tank sealing valve 1 opens a passage between the fuel tank and the canister, lowering the pressure of the fuel tank for preventing the release of the evaporated fuel to the open air.

The tank sealing valve 1 is provided with a housing 3 which forms a valve chamber 2, a first valve seat 4, a switch valve body 5, a first spring 6, a second valve seat 7, an open-close valve body 8, a return spring 9, an electro-magnetic actuator 10, and a pressure chamber defining member 11.

The housing 3 includes (i) a flow passage formation part 3a which provides a first passage 15 connected to the canister, a second passage 16 connected to the fuel tank, and the valve chamber 2 that has an opening 15a of the first passage 15 and an opening 16a of the second passage 16, and (ii) a drive chamber formation part 3b which houses the electro-magnetic actuator 10.

The second passage 16 always communicates with the valve chamber 2, and the pressure of the valve chamber 2 is equalized with the pressure of the second passage 16 (i.e., the fuel tank). Since the pressure on the fuel tank side is usually high and the fluid flows from the fuel tank to the canister, the second passage 16 is an upstream side in such flow and the first passage 15 is a downstream side therein.

In the valve chamber 2, the first valve seat 4 is annularly formed on the outside of the opening 15a of the first passage 15.

The flow passage formation part 3a has a cylindrical piping 20 which serves as the first passage 15, and, on one axial end of this piping 20, a first annular plane 20a and a second annular plane 20b are provided, the first annular plane 20a extending from an inner periphery of an opening toward an outer circumference and the second annular plane 20b disposed on an outside of the plane 20a with a step interposed therebetween in a connecting manner to shift the position of the plane 20b toward a farther axial end. This first plane 20a serves as the first valve seat 4.

The switch valve body 5 is a valve body housed in the valve chamber 2, which is seatable on and liftable from the first valve seat 4. In the present embodiment, the switch valve body 5 has a disk shape.

At a center of the disk of the switch valve body 5, a communication hole 21 penetrating in a board-thickness direction is provided. The communication hole 21 has an opening that has a smaller diameter than the opening 15a, and makes the first passage 15 and the valve chamber 2 freely communicable.

Therefore, in a seated state of the switch valve body 5 seated on the first valve seat 4, the first passage 15 and the valve chamber 2 are communicable via the communication hole 21 having a smaller diameter than the opening 15a, and, in a lifted state of the switch valve body 5 lifted from the first valve seat 4, the first passage 15 and the valve chamber 2 are flowably-connected via the opening 15a. In other words, the passage area size between the first passage 15 and the valve chamber 2 is switched by the lifting and the seating of the switch valve body 5.

The first spring 6 biases the switch valve body 5 towards a lift direction which lifts the valve body 5 from the first valve seat 4.

In the present embodiment, a supporter part 20c is formed on an inside of the piping 20 at a position on the other axial end side of the first plane 20a, and the first spring 6 is positioned between the switch valve body 5 and the supporter part 20c.

The second valve seat 7 is annularly formed on the outside of the opening of the communication hole 21. In other words, the second valve seat 7 is formed on a housing 3 that provides the first valve seat 4, and the second valve seat 7 is positioned on an outside of the first valve seat 4.

In the present embodiment, the second plane 20b serves as the second valve seat 7.

The open-close valve body 8 is another valve body positioned on a lift-off side of the switch valve body 5, which is a side away from the first valve seat 4.

The open-close valve body 8 opens and closes the first passage 15 to the valve chamber 2 by the lifting from and the seating on the second valve seat 7 when the switch valve body 5 is seated, for opening and closing the communication between the first passage 15 and the second passage 16.

The open-close valve body 8 has a closed-end cylindrical shape which opens to the second valve seat side, and has an abutting part 25 which lifts from and seats on the second valve seat 7 on its open end. The abutting part 25 is formed in an annular shape with a sealer that is made of the rubber material.

The open-close valve body 8 has, on a bottom of the cylinder, a hole, and a cylindrical shaft 27 is inserted into such hole so that the shaft 27 protrudes from a lift-off side of the bottom which is away from the second valve seat 7.

The return spring 9 biases the open-close valve body 8 in a seating direction seating the valve on the second valve seat 7.

The electro-magnetic actuator 10 is positioned on a lift-off side (i.e., away from the second valve seat 7) of the open-close valve body 8, and drives the open-close valve body 8 to the lifting side (i.e., the lift-off side away from the second valve seat 7) in a resisting manner resisting to the biasing force of the return spring 9.

The electro-magnetic actuator 10 has a coil 30 which generates magnetism by receiving a power supply, a moving body 31 which moves in one body with the open-close valve body 8, and a stator 32 which houses the moving body 31 in a slidable manner as well as attracting the moving body 31 with the magnetism generated by the coil 30.

The moving body 31 has a tube shape, and a part of the shaft 27 protruding from the open-close valve body 8 is fixed onto an inside of the tube (of the moving body 31). Thereby, the moving body 31 is fixed to the open-close valve body 8 via the shaft 27. Further, an in-cylinder part of the open-close valve body 8 and an inside of the moving body 31 are connected via an inside of a cylinder of the shaft 27, which allows communication of a fluid passing therethrough.

The pressure chamber defining member 11 is a member for forming a pressure cancel chamber 35 that is air-tightly separated from the valve chamber 2 on an lift-off side of the open-close valve body 8 (i.e., the lift-off side away from the second valve seat 7) when the open-close valve body 8 is seated.

The pressure cancel chamber 35 puts the same load that is equal to the pressure of the first passage 15 on lift-off side of the open-close valve body 8 when the open-close valve body 8 is seated. Thereby, the differential pressure between the upstream and the downstream of the open-close valve body 8 (i.e., pressure difference between the second valve seat side and the lift-off side away from the second valve seat) is reduced.

In the present embodiment, the pressure chamber defining member 11 is a diaphragm, and has a thin film ring shape with the rubber material, and has, on its inner periphery end, an inner circumference fixed part 11a fixed to the open-close valve body 8, and has, on its peripheral edge, an outer circumference fixed part 11b fixed to the housing 3.

The inner circumference fixed part 11a is fixed to a back end of the open-close valve body 8. The outer circumference fixed part 11b is pinched between the flow passage formation part 3a and the drive chamber formation part 3b, which are provided respectively as two separate parts of the housing 3.

Thereby, the lift-off side of the pressure chamber defining member 11 (i.e., the diaphragm) away from the second valve seat 7 serves as the pressure cancel chamber 35 separated from the valve chamber 2. In other words, the space in which the electro-magnetic actuator 10 is housed also serves as the pressure cancel chamber 35.

Further, the pressure of the first passage 15 is introduced into the pressure cancel chamber 35 via the inside of the open-close valve body 8, the inside of the shaft 27, the inside of the moving body 31, the inside of the moving body 31, and a sliding gap between the moving body 31 and stator 32 when the open-close valve body 8 is seated.

Feature of the Present Embodiment

The tank sealing valve 1 has, at a position in an inside of an abutting part 25 that has an annular shape for seating on the second valve seat 7, a press member 40 that presses the switch valve body 5 toward the first valve seat 4 with a (biasing) force greater than a force from the first spring 6 during a period (a) between an all-close state and (b) a timing immediately after the lifting of the open-close valve body 8 from the second valve seat 7.

Here, the all-close state is a state in which the switch valve body 5 is seated on the first valve seat 4 and the open-close valve body 8 is seated on the second valve seat 7. In other words, it is a state in which the electro-magnetic actuator 10 is not receiving a power supply, and the passage between the first passage 15 and the second passage 16 is closed.

The press member 40 applies a force for pressing the switch valve body 5 from the all-close state up until a timing that is immediately after the lifting of the open-close valve body 8 so that the seated state of the switch valve body 5 is kept unchanged, and releases the force thereafter.

One exemplary configuration of the press member 40 adopted in the present embodiment is described below.

In the following description, the driving direction of the open-close valve body 8 is designated as an axial direction, with the second valve seat side designated as a forward side and the opposite side designated as a backward side. In other words, a right-hand side in the drawing is a forward side, and a left-hand side in the drawing is a backward side.

The press member 40 is provided with a column piece 41, a stopper 42, and a second spring 43 which are respectively described in the following.

The column piece 41 is disposed to be movable in an axial direction relative to the open-close valve body 8 in an inside of the abutting part 25.

For example, the column piece 41 has a column shape and is loosely inserted in an inside of the cylinder of the open-close valve body 8. Further, a forward face of the column piece 41 abuts on and separates from the switch valve body 5, and a backward end of the column piece 41 has a flange 41a formed thereon.

The stopper 42 regulates the movement of the column piece 41 toward the forward side of the axial direction while being fixed to the open-close valve body 8.

For example, the stopper 42 is fixed as an inner brim that protrudes from an inner circumference surface of the cylinder of the open-close valve body 8, and regulates the movement of the column piece 41 toward the forward side of the axial direction by engagingly stopping the flange 41a.

The second spring 43 is positioned on the backward side of the column piece 41, and biases the column piece 41 toward the stopper 42. Namely, the column piece 41 is biased to the forward side in the axial direction, i.e., in the direction which presses the switch valve body 5. The spring load of the second spring 43 is greater than the first spring 6.

Figure 3:
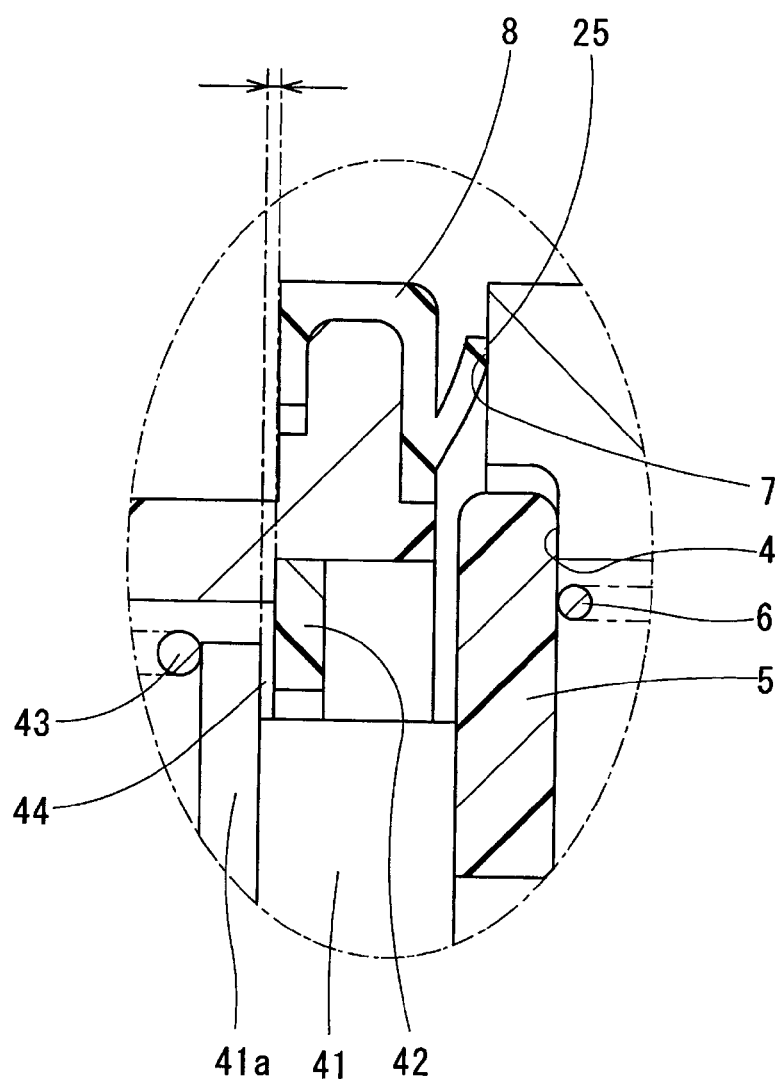
FIG. 3 is a partial view of FIG. 2 in a larger scale in the first embodiment.

The position and the dimension of both of the column piece 41 and the stopper 42 are, in the all-close state in which the column piece 41 abuts on the switch valve body 5, set to provide a gap space 44 between the stopper 42 and the column piece 41 along the axial direction (refer to FIG. 3).

In such manner, when the open-close valve body 8 in the all-close state moves toward the backward side and lifts from the seat, the stopper 42 abuts on the flange 41a after the move by the open-close valve body 8 by an amount of the gap space 44, and thereafter lifts and brings/separates the column piece 41 away from the switch valve body 5 toward the backward side in the move with the open-close valve body 8 and the column piece 41.

By providing the gap space 44, the column piece 41 separates from the switch valve body 5 after the lifting of the open-close valve body 8 from the seat, instead of causing the separation of the column piece 41 from the switch valve body 5 at the same time of the lifting of the open-close valve body 8. This gap space 44 is set to have a small dimension so that the column piece 41 separates from the switch valve body 5 immediately after the lifting of the open-close valve body 8 from the seat.

The column piece 41 abuts on the switch valve body 5, allowing a flow of fluid from the communication hole 21 to an inside of the cylinder of the open-close valve body 8. In other words, the abutment of the column piece 41 (on the open-close valve body 8) is not an air-tightly made on an opening edge of the communication hole 21.

Further, the column piece 41 may have a tube shape, and may have a configuration in which the inside of the cylinder of the column piece 41 communicates with the inside of the cylinder of the communication hole 21 and the open-close valve body 8.

Operational Effect of the Present Embodiment

The operational effect of the present embodiment is described with the operation of the tank sealing valve 1.

Figure 2:
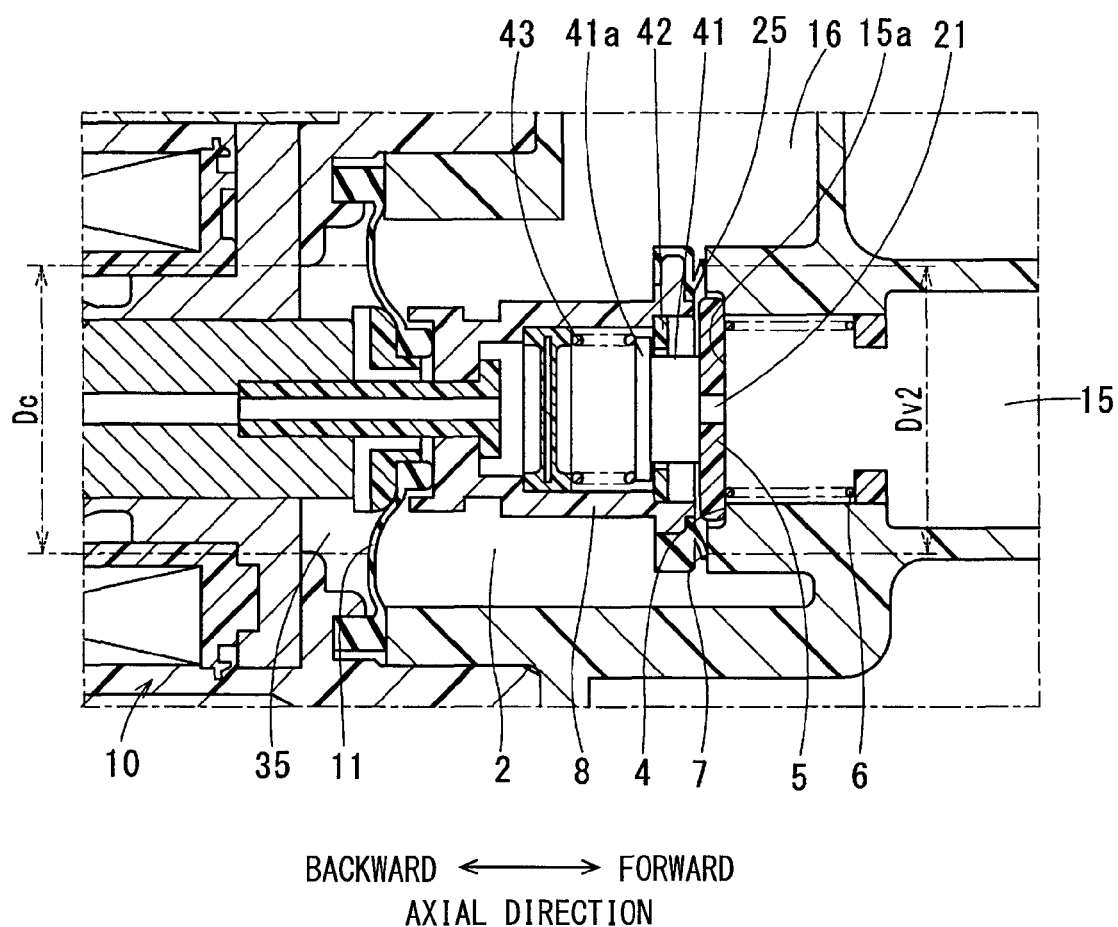
FIG. 2 is a sectional view of an important part of the electro-magnetic valve in an all-close state in the first embodiment.

The tank sealing valve 1 is in the all-close state, as shown in FIGS. 2 and 3 when no power supply is provided thereto.

At such time, the column piece 41 presses the switch valve body 5 toward the first valve seat 4 and the switch valve body 5 is in the seated state, since the spring load of the second spring 43 is greater than the first spring 6. Further, when the column piece 41 is in an abutting state onto the switch valve body 5, the gap space 44 is formed between the stopper 42 and the column piece 41.

When the electro-magnetic actuator 10 receives a power supply according to the valve open command from the ECU, the moving body 31 moves toward the backward side, elastically deforming the pressure chamber defining member 11 (i.e., the diaphragm), and the open-close valve body 8 lifts from the second valve seat 7.

Figure 4:
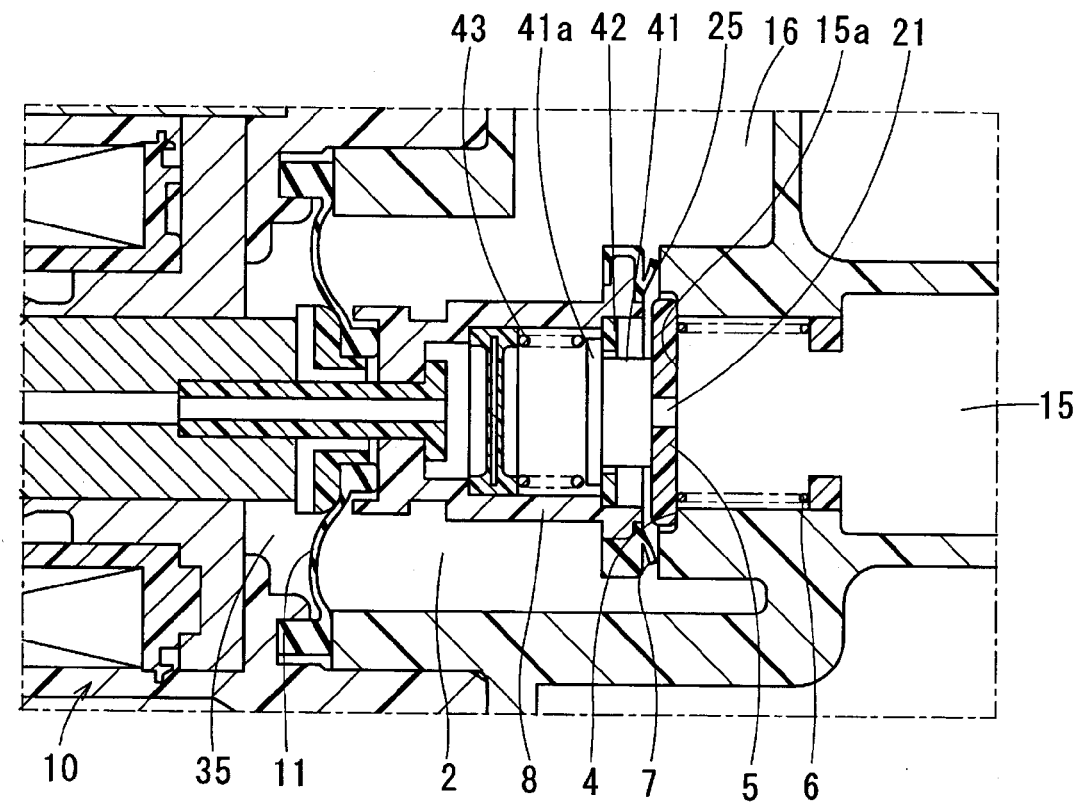
FIG. 4 is a sectional view of the electro-magnetic valve immediately after a lifting of an open-close valve in the first embodiment.
Figure 5:
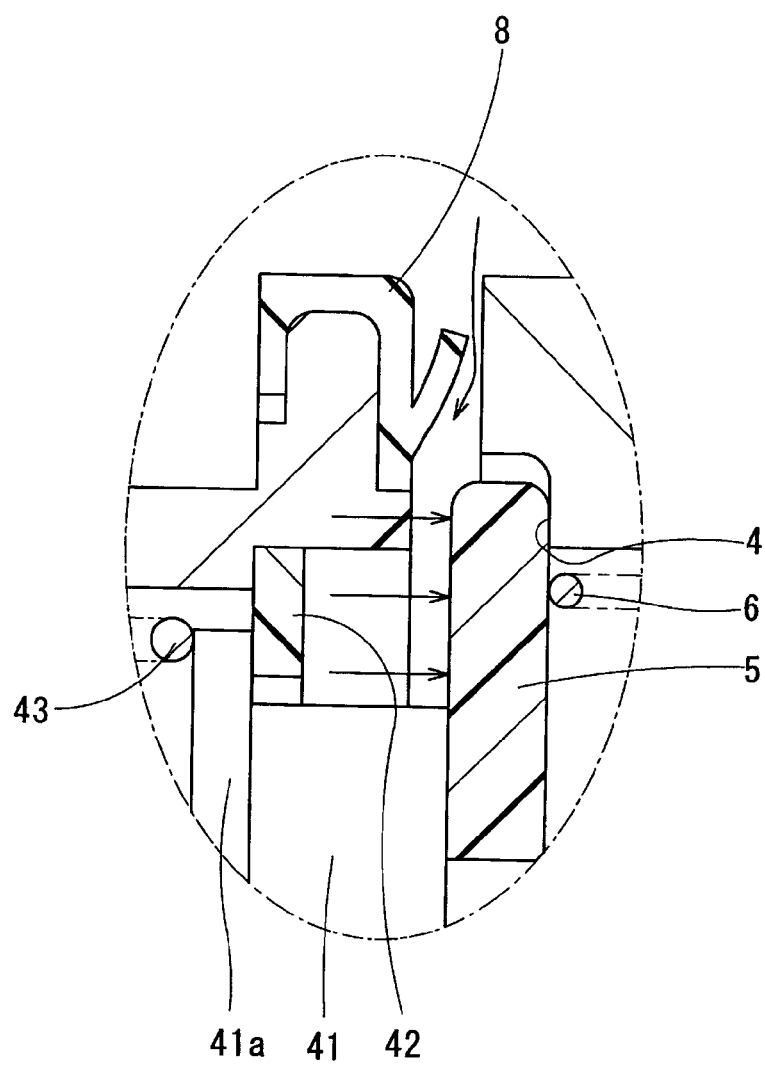
FIG. 5 is a partial view of FIG. 4 in a larger scale in the first embodiment.

As shown in FIGS. 4 and 5, immediately after the lifting of the valve body 8), the column piece 41 is kept in a press state in which it applies a pressure to the switch valve body 5.

In addition, the pressure of the valve chamber 2 acts on the switch valve body 5 immediately after the lifting of the open-close valve body 8. Since the pressure of the valve chamber 2 at a time of having the valve open command is usually a positive pressure, which is higher than the pressure of the first passage 15, a pressure receiving load according to the differential pressure between the valve chamber 2 and the first passage 15 is applied onto the lift-off side of the switch valve body 5 away from the first valve seat 4.

Therefore, the switch valve body 5 is kept in the seated state seating on the first valve seat 4, by the pressure receiving load and the force from the column piece 41 (at a time) immediately after the lifting of the open-close valve body 8.

Figure 6:
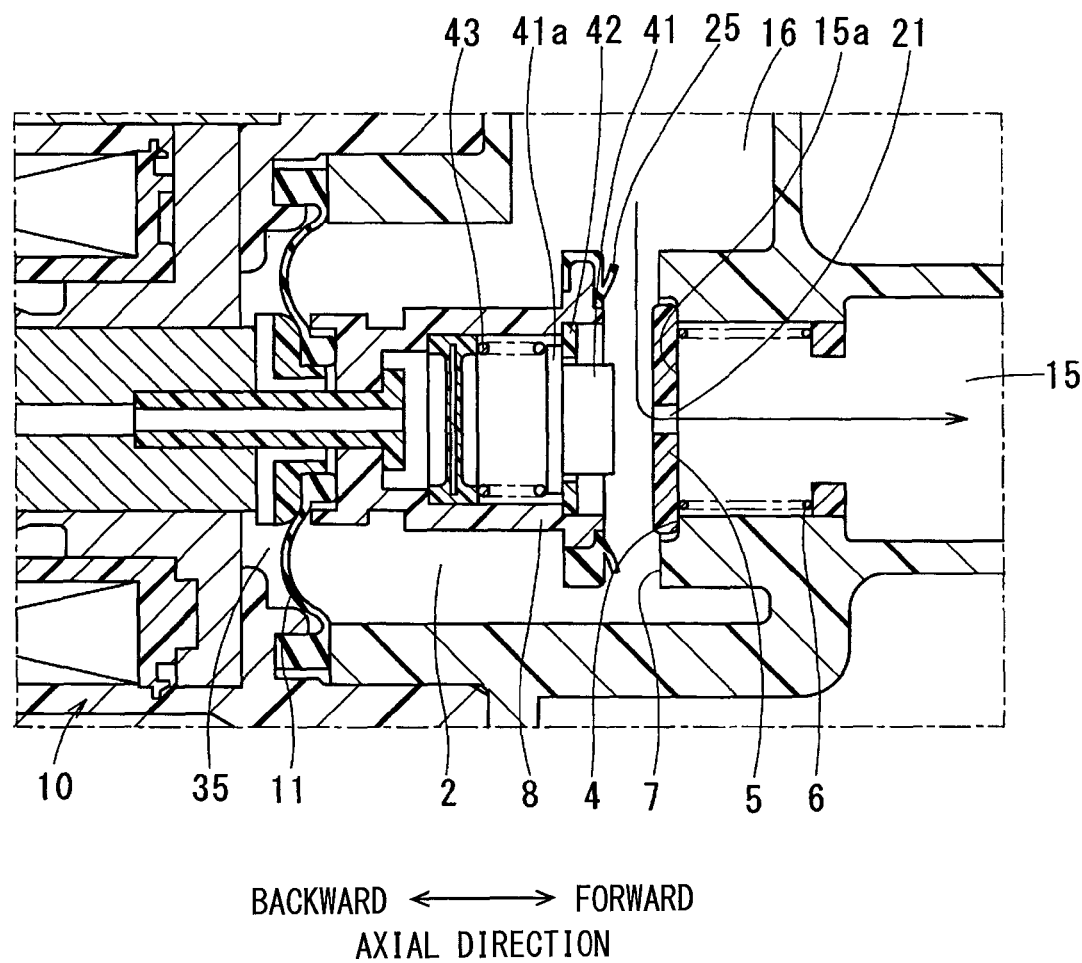
FIG. 6 is a sectional view of an important part of the electro-magnetic valve in an open-in-part state in the first embodiment.
Figure 7:
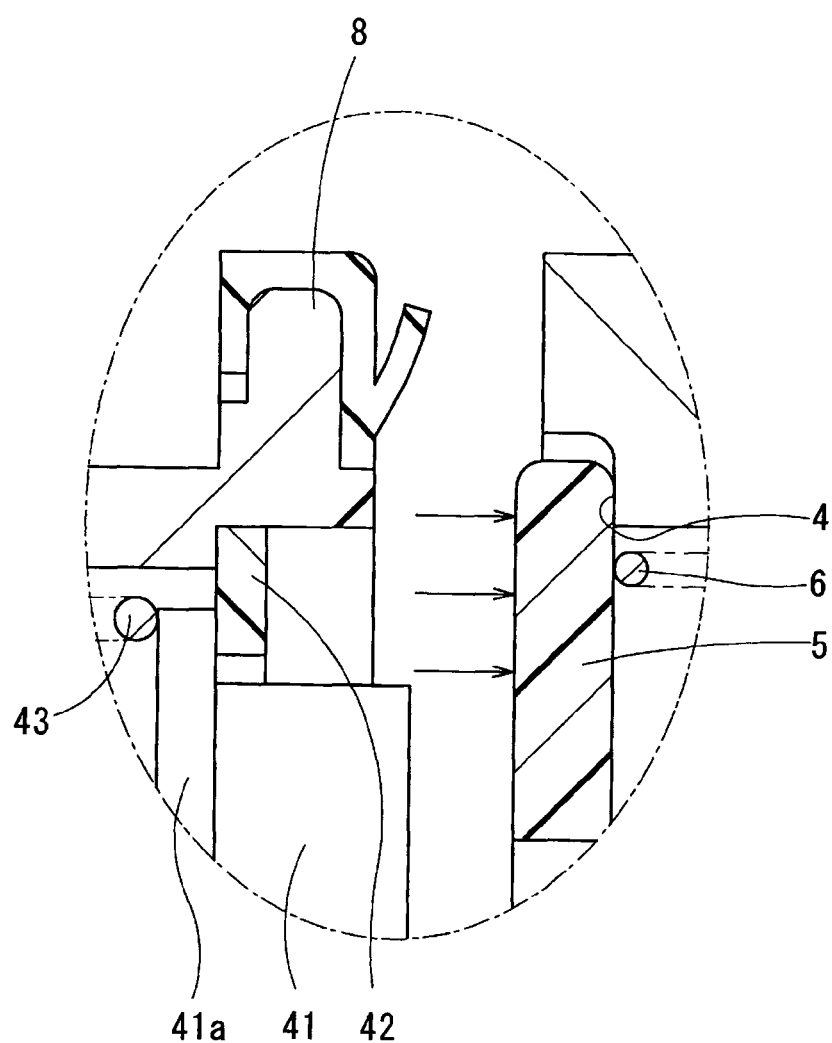
FIG. 7 is a partial view of FIG. 6 in a larger scale in the first embodiment.

When the open-close valve body 8 lifts further, i.e., by an amount equal to or exceeding the gap space 44, the column piece 41 is regulated/constrained by the stopper 42, thereby lifting the column piece 41 together with the open-close valve body 8 (refer to FIGS. 6 and 7).

In other words, even though the pressing force from the column piece 41 is released (at such a timing), the pressure receiving load is already put onto the switch valve body 5. Therefore, when the pressure of the valve chamber 2 is high, the switch valve body 5 does not follow the lifting of the open-close valve body 8. That is, the switch valve body 5 does not lift from the seat.

Then, the fluid flows from the second passage 16 into the first passage 15 via the communication hole 21 and the valve chamber 2, by the lifting of the open-close valve body 8.

This state, i.e., when the open-close valve body 8 is lifted and the switch valve body 5 is seated, is designated an open-in-part state (refer to FIGS. 4 to 7).

Thereby, the pressure of the second passage 16 and the valve chamber 2 falls. In other words, the pressure receiving load of the switch valve body 5 also falls.

Figure 8:
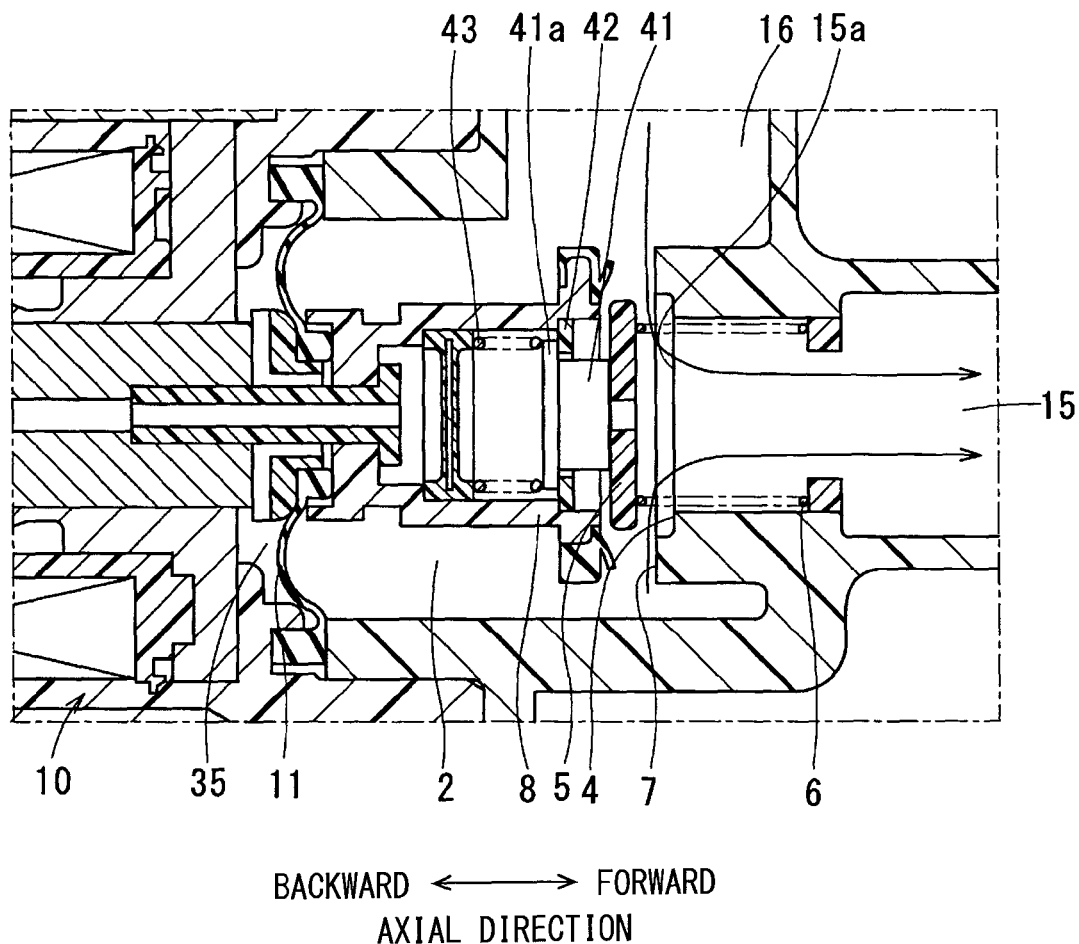
FIG. 8 is a sectional view of an important part of the electro-magnetic valve in the open-in-part state in the first embodiment.
Figure 9:
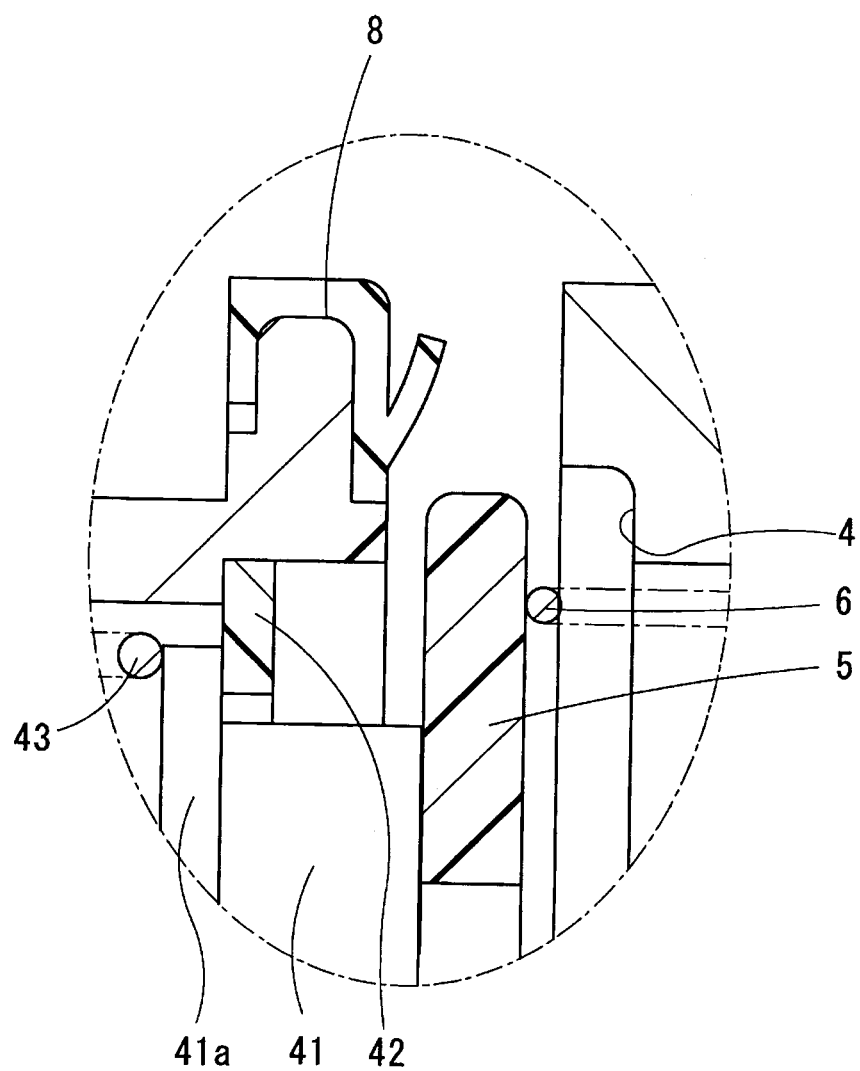
FIG. 9 is a partial view of FIG. 8 in a larger scale in the first embodiment.

When this pressure receiving load lowers than the biasing force of the first spring 6, as shown in FIGS. 8 and 9, the switch valve body 5 lifts from the first valve seat 4. In other words, an all-open state in which the fluid flows from the second passage 16 into the first passage 15 via the opening 15a and the valve chamber 2 is realized.

In the present embodiment, the conventional structure in which a pressure receiving diameter of the open-close valve body 8 is different from a pressure receiving diameter of the switch valve body 5 for applying the pressure onto the switch valve body in the all-close state is not required.

That is, in the conventional structure, for keeping the seated state of the switch valve body 5 immediately after the lifting of the open-close valve body 8, the pressure is already applied in the all-close state onto the switch valve body by providing a difference between (i) a pressure receiving diameter of the open-close valve body 8 and (ii) a pressure receiving diameter of the switch valve body 5.

However, in the present embodiment, the structure for keeping the seated state of the switch valve body 5 immediately after the lifting of the open-close valve body 8 is realized as the one in which the press member 40 presses the switch valve body 5 up until the immediately-after timing of the lifting of the open-close valve body 8, i.e., by the time when the pressure of the valve chamber 2 is introduced into the switch valve body 5.

According to such a structure, it is not necessary for the switch valve body 5 to receive the pressure in the all-close state. In other words, it is not necessary for the pressure receiving diameter of the open-close valve body 8 to be smaller than the pressure receiving diameter of the switch valve body 5. Therefore, the pressure receiving diameter of the open-close valve body 8 may be designed without regard to the pressure receiving diameter of the switch valve body 5, which increases a degree of freedom of how those diameters are designed. Therefore, for making the most of the effect of the pressure cancel mechanism, the pressure receiving diameter Dv2 of the open-close valve body 8 may be equated to the effective pressure receiving diameter Dc of the pressure chamber defining member 11 (i.e., the diaphragm). That is, the effect of the pressure cancel mechanism is maximized.

Second Embodiment

Figure 10:
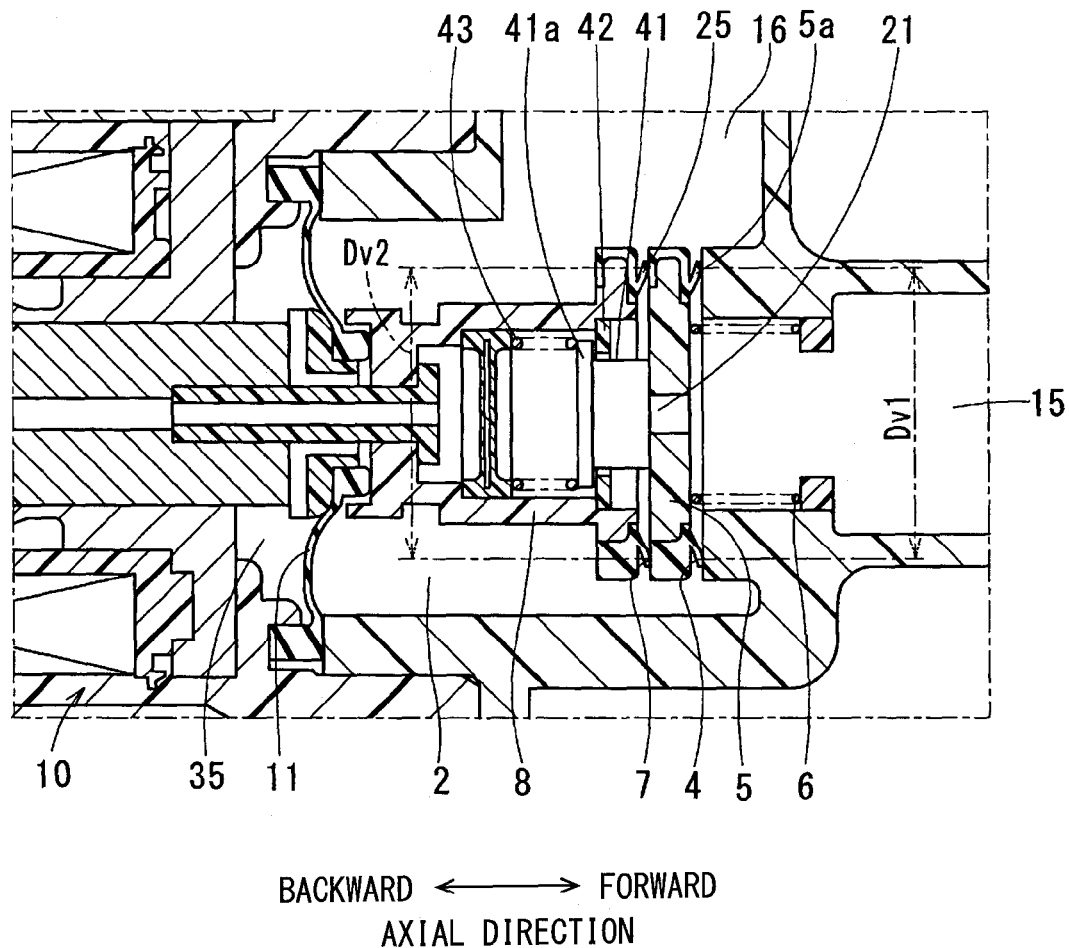
FIG. 10 is a sectional view of an important part of the electro-magnetic valve in a second embodiment.

The second embodiment is described with reference to FIG. 10, in which the difference from the first embodiment is mainly described.

In the present embodiment, the same numerals of the first embodiment are assigned to the same parts for the reference to the preceding description and for the brevity thereof.

In the present embodiment, the second valve seat 7 is formed on the lift-off side of the switch valve body 5, which is a side away from the first valve seat 4.

According to such configuration, the pressure receiving diameter of Dv1 of the switch valve body 5 is equated to the pressure receiving diameter of Dv2 of the open-close valve body 8.

In addition, a portion 5a which seats on the first valve seat 4 of the switch valve body 5 has a lip shape to form an elastic-resin seal member that is made of a rubber material or the like.

According to such configuration, by absorbing an impact of the seating of the switch valve body 5 and the open-close valve body 8 with the seal member, an impact noise is reduced.

Third Embodiment

Figure 11:
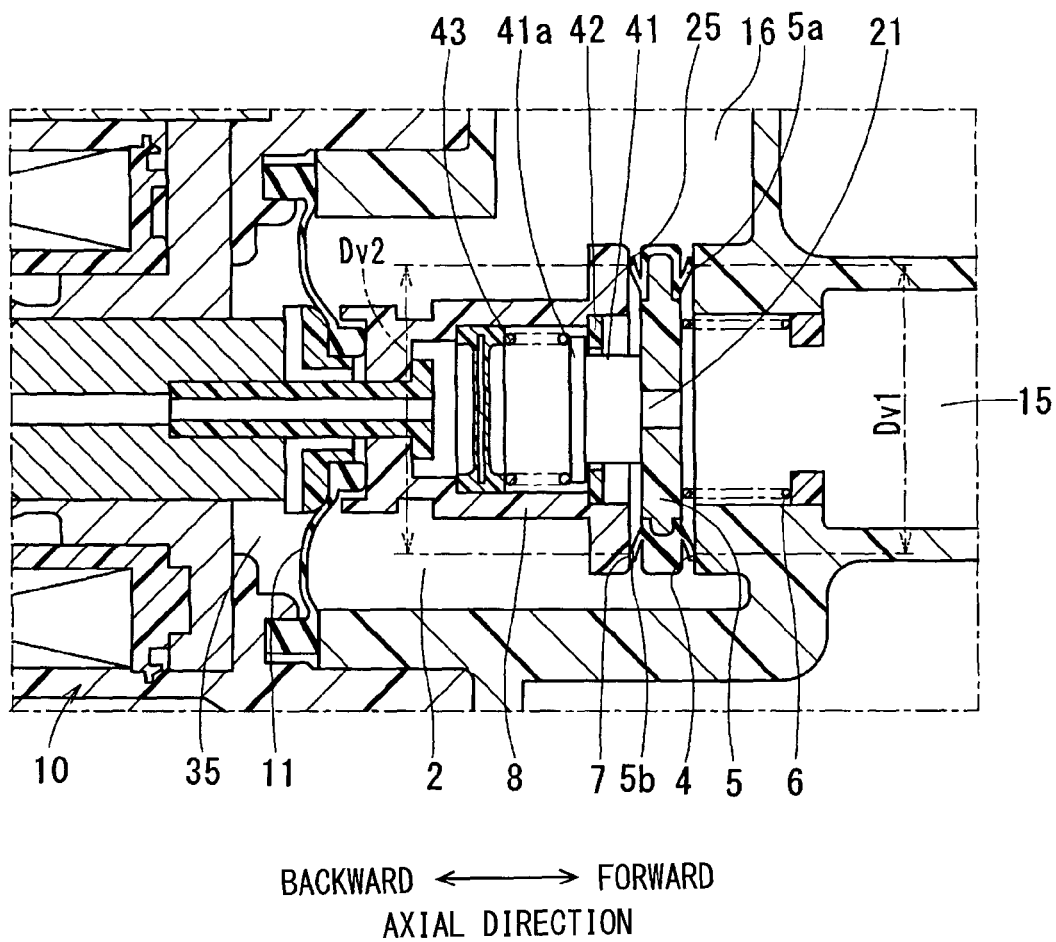
FIG. 11 is a sectional view of an important part of the electro-magnetic valve in a third embodiment.
Figure 12:
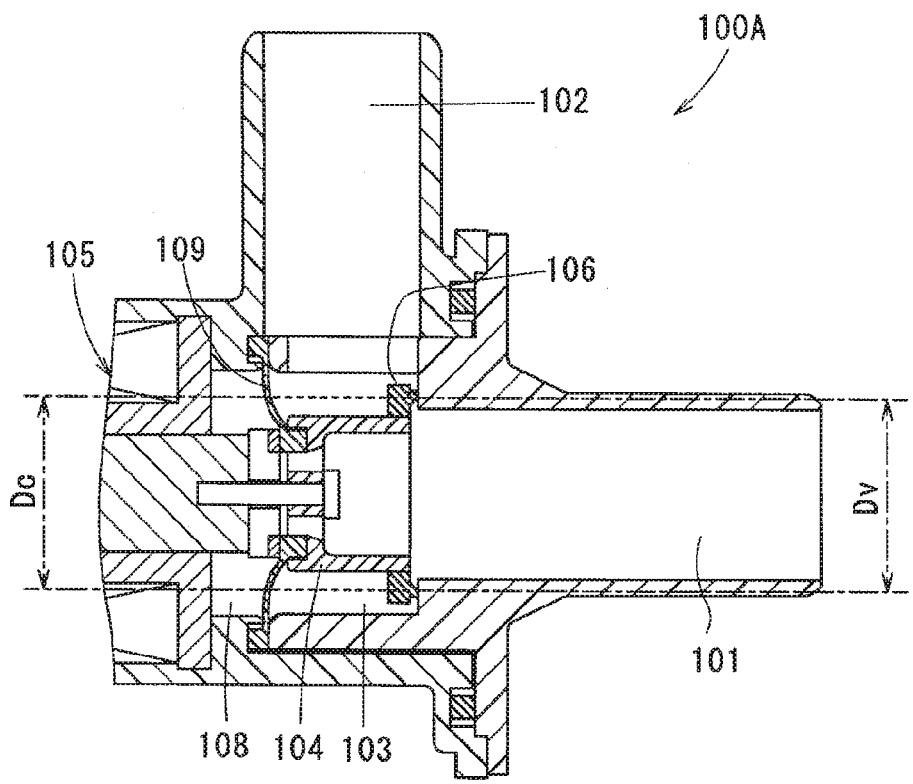
FIG. 12 is a sectional view of an important part of the electro-magnetic valve in a conventional example.
Figure 13:
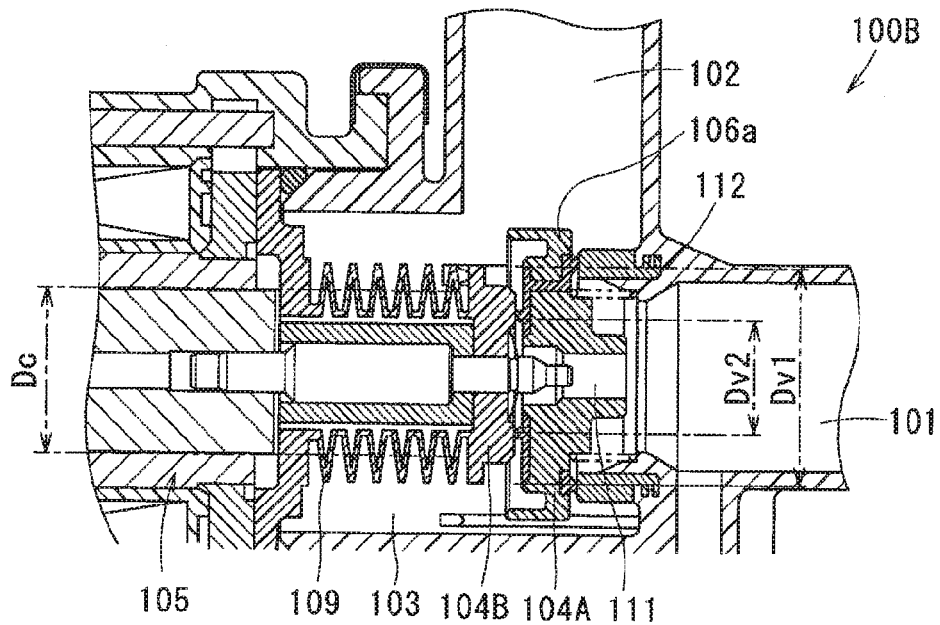
FIG. 13 is a sectional view of an important part of the electro-magnetic valve in the conventional example.

The third embodiment is described with reference to FIG. 11, in which the difference from the first embodiment is mainly described.

In the present embodiment, the same numerals of the first embodiment are assigned to the same parts for the reference to the preceding description and for the brevity thereof.

In the present embodiment, the second valve seat 7 is formed on the lift-off side of the switch valve body 5, which is a side away from the first valve seat 4, just like the second embodiment.

According to such configuration, the pressure receiving diameter of Dv1 of the switch valve body 5 is equated to the pressure receiving diameter of Dv2 of the open-close valve body 8.

Further, the switch valve body 5 is configured in the following manner. That is, both of the portion 5a which seats on the switch valve body 5 and a portion 5b that serves as the second valve seat 7 (i.e., a portion on which and from which the abutting part 25 of the open-close valve body 8 abuts and separates) are formed as the elastic-resin seal member that is made of the rubber material or the like. In other words, an annular sealer is fixed onto the both sides of the switch valve body 5.

According to such configuration, by absorbing an impact of the seating of the switch valve body 5 and the open-close valve body 8 with the seal member, an impact noise is reduced.

Modification

In the first to third embodiments, the diaphragm is used as the pressure chamber defining member 11. However, a bellows may be used instead, as the electro-magnetic valve disclosed in the patent document 2.

Although the present disclosure has been fully described in connection with preferred embodiment thereof with reference to the accompanying drawings, it is to be noted that various changes and modifications will become apparent to those skilled in the art, and such changes, modifications, and summarized scheme are to be understood as being within the scope of the present disclosure as defined by appended claims.

What is claimed is:

1. An electro-magnetic valve comprising:
   a valve chamber having a first passage opening that is open to a first passage and a second passage opening open to a second passage;
   a first valve seat annularly formed on an outside of the first passage opening in the valve chamber;
   a switch valve body in the valve chamber having a communication hole that has a smaller diameter than the first passage opening, the switch valve body switching a flow amount of a flow between the first passage and the valve chamber by lifting off from and seating on the first valve seat;
   a first spring biasing the switch valve body away from the first valve seat;
   a second valve seat annularly formed on an outside of an opening of the communication hole;
   an open-close valve body lifting off from and seating on the second valve seat while the switch valve body is seating on the first valve seat for communication between the first passage and the second passage by opening and closing the first passage to and from the valve chamber, the open-close valve body positioned on a lift-off side of the switch valve body relative to the first valve seat;
   a return spring biasing the open-close valve body toward the second valve seat;
   an electro-magnetic actuator lifting the open-close valve body from the second valve seat against a biasing force of the return spring, the electro-magnetic actuator positioned on a lift-off side of the open-close valve body relative to the second valve seat; and
   a pressure chamber defining member defining a pressure cancel chamber that reduces a pressure difference between both sides of the open-close valve body by applying a same pressure as a pressure in the first passage on the lift-off side of the open-close valve body relative to the second valve seat, wherein
   the communication between the first passage and the second passage is:
   (A) in an all-close state that closes all communication therebetween when the switch valve body is seated on the first valve seat and the open-close valve body is seated on the second valve seat;
   (B) in an open-in-part state that partially opens communication therebetween when (i) the open-close valve body is lifted from the second valve seat and (ii) the switch valve body is seated on the first valve seat under pressure of the valve chamber, the communication therebetween being established via the communication hole and the valve chamber; and
   (C) in an all-open state that opens all communication therebetween when the switch valve body is lifted from the first valve seat due to a pressure reduction of the valve chamber caused by the lifting of the open-close valve body from the second valve seat, and the open-close valve body has, at a position inside of an abutting part that has an annular shape for seating on the second valve seat, a press member that presses the switch valve body toward the first valve seat with a biasing force greater than a force from the first spring during a period (a) between the all-close state and (b) a timing immediately after the lifting of the open-close valve body from the second valve seat.

2. The electro-magnetic valve of claim 1, wherein when designating that the open-close valve body moves along an axial direction toward a forward side defined as a second-valve-seat side or toward a backward side defined as an away-from-second-valve-seat side, the press member includes:
  a column piece movable relative to the open-close valve body along the axial direction in an inside of the abutting part for abutment on and detachment from the switch valve body;
  a second spring biasing the column piece toward the stopper with a spring force from the second spring that is greater than a spring force from the first spring; and
  a stopper fixedly disposed on the open-close valve body for stopping the column piece from moving toward the forward side of the axial direction, the column piece and the stopper interposed with a space that at least separates the column piece and the stopper in the axial direction in the all-close state that abuts the column piece on the switch valve body, and when the open-close valve body in the all-close state moves toward the backward side to lift from the second valve seat, the stopper abuts on the column piece by an amount of the space, and thereafter lifts and lifts the column piece away from the switch valve body toward the backward side.

3. The electro-magnetic valve of claim 1, wherein the second valve seat is formed on a housing that provides the first valve seat, and the second valve seat is positioned on an outside of the first valve seat.

4. The electro-magnetic valve of claim 1, wherein the switch valve body is formed in a disk shape, and the second valve seat is formed on a side of the switch valve body that is away from the first valve seat.

5. The electro-magnetic valve of claim 4, wherein the switch valve body has (i) an abutting portion on which the open-close valve body abuts and (ii) a seating portion for seating on the first valve seat, and the abutting portion and the seating portion are made of an elastically-deformable sealing member.

6. The electro-magnetic valve of claim 1, wherein a seating portion of the switch valve body which seats on the first valve seat and the abutting part are respectively made of an elastically-deformable sealing member.

* * * * *